(12) United States Patent
Bar Lev et al.

(10) Patent No.: US 11,568,010 B2
(45) Date of Patent: *Jan. 31, 2023

(54) METHODS AND SYSTEMS FOR GENERATING CONTENT FOR USERS OF A SOCIAL NETWORKING SERVICE

(71) Applicant: META PLATFORMS, INC., Menlo Park, CA (US)

(72) Inventors: Tamar Bar Lev, Tel Aviv (IL); Volodymyr Giginiak, London (GB); Markus Klaus Georg Emrich, San Francisco, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,298

(22) Filed: Dec. 7, 2020

(65) Prior Publication Data

US 2021/0089600 A1 Mar. 25, 2021

Related U.S. Application Data

(63) Continuation of application No. 15/404,119, filed on Jan. 11, 2017, now Pat. No. 10,878,046.

(51) Int. Cl.
*G06F 16/9535* (2019.01)
*G06F 16/28* (2019.01)
*G06F 16/2457* (2019.01)

(52) U.S. Cl.
CPC .... *G06F 16/9535* (2019.01); *G06F 16/24578* (2019.01); *G06F 16/287* (2019.01)

(58) Field of Classification Search
None
See application file for complete search history.

(56) References Cited

U.S. PATENT DOCUMENTS 10,878,046 B2 * 12/2020 Lev ................ G06F 16/287
2006/0041848 A1 2/2006 Lira
(Continued)

OTHER PUBLICATIONS

Bar Lev, Office Action, U.S. Appl. No. 15/404,119, dated Nov. 2, 2018, 28 pgs.
(Continued)

*Primary Examiner* — Kim T Nguyen
(74) *Attorney, Agent, or Firm* — Morgan, Lewis & Bockius LLP

(57) ABSTRACT

An exemplary method of generating content for a user of a social networking service includes, in an application of a social networking service, receiving a classification model from a server system associated with the social networking service. The method further includes generating a collage for a user. The collage includes a set of content items stored on the client device. The method also includes, presenting the collage to the user if the collage satisfies a criterion included in the classification model. The method also includes tracking and providing user-interaction data for the collage to the server system, and receiving an updated classification model from the server system in accordance with the user-interaction data. The method also includes generating and presenting a new collage that includes a new set of content items stored on the client device, if the new collage satisfies the criterion included in the updated classification model.

20 Claims, 10 Drawing Sheets

(56) References Cited

U.S. PATENT DOCUMENTS

| | | | |
|---|---|---|---|
| 2012/0005224 A1* | 1/2012 | Ahrens | G06F 3/04842 |
| | | | 707/769 |
| 2012/0246267 A1* | 9/2012 | Mallet | G06F 16/955 |
| | | | 709/217 |
| 2014/0173501 A1* | 6/2014 | Wu | G06F 16/904 |
| | | | 715/781 |
| 2014/0214964 A1* | 7/2014 | Liyanage | H04L 51/52 |
| | | | 709/205 |
| 2015/0334307 A1 | 11/2015 | Thurairatnam | |
| 2016/0070704 A1 | 3/2016 | Yu | |
| 2016/0337286 A1* | 11/2016 | Bastide | H04L 51/00 |
| 2016/0338179 A1* | 11/2016 | Aliakseyeu | H05B 47/19 |
| 2016/0344828 A1 | 11/2016 | Hausler et al. | |
| 2016/0350782 A1* | 12/2016 | Wang | G06Q 20/387 |
| 2016/0379314 A1* | 12/2016 | Trudeau | G06Q 50/01 |
| | | | 705/319 |
| 2016/0380951 A1* | 12/2016 | Chakra | H04L 51/52 |
| | | | 709/206 |
| 2018/0196879 A1* | 7/2018 | Lev | G06F 16/24578 |
| 2021/0089600 A1* | 3/2021 | Bar Lev | G06F 16/287 |

OTHER PUBLICATIONS

Bar Lev, Office Action, U.S. Appl. No. 15/404,119, dated May 23, 2019, 28 pgs.

Bar Lev, Office Action, U.S. Appl. No. 15/404,119, dated Feb. 20, 2020, 26 pgs.

Bar Lev, Notice of Allowance, U.S. Appl. No. 15/404,119, dated Sep. 29, 2020, 10 pgs.

* cited by examiner

METHODS AND SYSTEMS FOR GENERATING CONTENT FOR USERS OF A SOCIAL NETWORKING SERVICE

RELATED APPLICATIONS

This application is a continuation of U.S. patent application Ser. No. 15/404,119, filed Jan. 11, 2017, entitled "Methods and Systems for Generating Content for Users of a Social Networking Service," which is incorporated by reference in its entirety.

TECHNICAL FIELD

This relates generally to generating content, including but not limited to generating content for users of a social networking service.

BACKGROUND

Social networking services provide a convenient means for users to share information (e.g., posting content items such as images and videos). Social networking services may, on occasion, generate content for their users using the shared information. Generating content from content items stored on client devices of their users, however, can present privacy issues for the social networking services and their users. Identifying potential content items that might be included in generated content also presents challenges, because the content items might not be associated with the social networking service.

SUMMARY

Accordingly, there is a need for methods and systems for generating content from content items that are stored on a client device of a user. In an application for a social networking service executing on the client device, content items stored on the client device independently of the application are detected and content for the user is generated using some of the detected content items. Thereafter, the client device may present the generated content to the user in the application for the social networking service. The user may interact with the application to post the presented content to the social networking service. Such methods and systems allow the social networking services to generate content for their users while bearing in mind privacy concerns of their users.

In accordance with some embodiments, a method is performed at a client device having one or more processors and memory storing instructions for execution by the processors. The method includes, in an application of a social networking service, receiving a classification model from a server system associated with the social networking service. The method further includes detecting content items stored on the client device independently of the application. The method further includes generating content for a user of the social networking service that includes a set of content items from the detected content items, based at least in part on metadata for the set of content items. The metadata is stored at the client device. The method further includes, in accordance with a determination that the generated content for the user satisfies a criterion included in the classification model, presenting the content to the user in the application.

In accordance with some embodiments, a client device includes one or more processors/cores, memory, and one or more programs; the one or more programs are stored in the memory and configured to be executed by the one or more processors/cores. The one or more programs include an application of a social networking service. The application includes instructions for performing the operations of the method described above. In accordance with some embodiments, a non-transitory computer-readable storage medium has stored therein an application of a social networking service, which includes instructions that, when executed by one or more processors/cores of a client device, cause the client device to perform the operations of the method described above.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first score could be termed a second score, and, similarly, a second score could be termed a first score, without departing from the scope of the various described embodiments. The first score and the second score are both scores, but they are not the same score unless stated otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
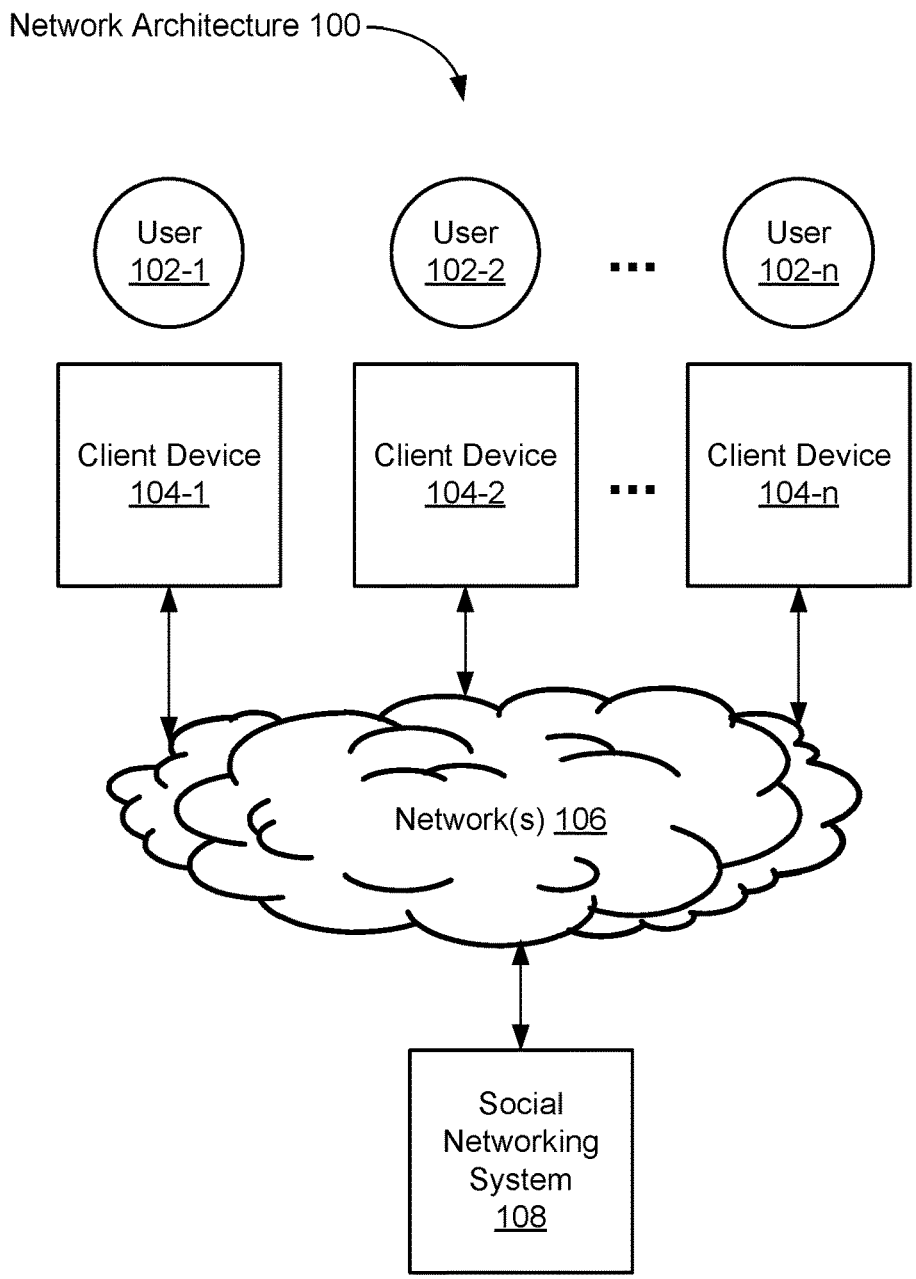
FIG. 1 is a block diagram illustrating an exemplary network architecture of a social network, in accordance with some embodiments.

FIG. 1 is a block diagram illustrating an exemplary network architecture of a social network in accordance with some embodiments. The network architecture 100 includes a number of client devices (also called "client systems," "client computers," or "clients") 104-1, 104-2, . . . 104-n communicably connected to a social networking system 108 by one or more networks 106.

In some embodiments, the client devices 104-1, 104-2, . . . 104-n are computing devices such as smart watches, personal digital assistants, portable media players, smart phones, tablet computers, 2D gaming devices, 3D gaming devices, virtual reality devices, laptop computers, desktop computers, televisions with one or more processors embedded therein or coupled thereto, in-vehicle information systems (e.g., an in-car computer system that provides navigation, entertainment, and/or other information), or other appropriate computing devices that can be used to communicate with an electronic social networking system and other computing devices (e.g., via the electronic social networking system). In some embodiments, the social networking system 108 is a single computing device such as a computer server, while in other embodiments, the social networking system 108 is implemented by multiple computing devices working together to perform the actions of a server system (e.g., cloud computing). In some embodiments, the network 106 is a public communication network (e.g., the Internet or a cellular data network), a private communications network (e.g., private LAN or leased lines), or a combination of such communication networks.

Users 102-1, 102-2, . . . 102-n employ the client devices 104-1, 104-2, . . . 104-n to access the social networking system 108 and to participate in a social networking service. For example, one or more of the client devices 104-1, 104-2, . . . 104-n execute web browser applications that can be used to access the social networking service. As another example, one or more of the client devices 104-1, 104-2, . . . 104-n execute software applications that are specific to the one or more social networks (e.g., social networking "apps" running on smart phones or tablets, such as a Facebook social networking application, a messaging application, etc., running on an iPhone, Android, or Windows smart phone or tablet). In some embodiments, a user (e.g., user 102-1, 102-2, . . . 102-n) may permit a software application executing on his or her client device to access features of his or her device. For example, the user may permit the software application to access images and videos stored on his or her device. In this way, the software application may detect the images and videos stored on the client device.

Users interacting with the client devices 104-1, 104-2, . . . 104-n can participate in the social networking service provided by the social networking system 108 by providing and/or consuming (e.g., posting, writing, viewing, publishing, broadcasting, promoting, recommending, sharing) information, such as text comments (e.g., statuses, updates, announcements, replies, location "check-ins," private/group messages), digital content items (e.g., photos (i.e., images), videos, audio files, links, documents), and/or other electronic content. In some embodiments, users provide information to a page, group, message board, feed, and/or user profile of a social networking service provided by the social networking system 108. Users of the social networking service can also annotate information posted by other users of the social networking service (e.g., endorsing or "liking" a posting of another user, commenting on a posting by another user, or sharing a posting of another user).

In some embodiments, information can be posted on a user's behalf by systems and/or services external to the social network or the social networking system 108. For example, the user may post a review of a movie to a movie review website, and with proper permissions that website may cross-post the review to the social network on the user's behalf. In another example, a software application executing on a mobile client device (e.g., the client device 104-1), with proper permissions, may use a global navigation satellite system (GNSS) (e.g., global positioning system (GPS), GLONASS, etc.) or other geo-location capabilities (e.g., Wi-Fi or hybrid positioning systems) to determine the user's location and update the social network with the user's location (e.g., "At Home," "At Work," or "In San Francisco, Calif."), and/or update the social network with information derived from and/or based on the user's location. Users interacting with the client devices 104-1, 104-2, . . . 104-n can also use the social network provided by the social networking system 108 to define groups of users. Users interacting with the client devices 104-1, 104-2, . . . 104-n can also use the social network provided by the social networking system 108 to communicate (e.g., using a messaging application or built-in feature) and collaborate with each other.

In some embodiments, a software application executing on a mobile client device (e.g., the client device 104-1), with proper permissions, may access content items stored on the mobile client device independently of the software application. For example, the content items may be images stored in a photo editing application of the mobile client device. In some embodiments, the content items may be stored in a cloud storage system (e.g., at a third-party server).

In some embodiments, the network architecture 100 also includes third-party servers (not shown). In some embodiments, third-party servers are associated with third-party service providers who provide services and/or features to users of a network (e.g., users of the social networking system 108, FIG. 1).

Figure 2:
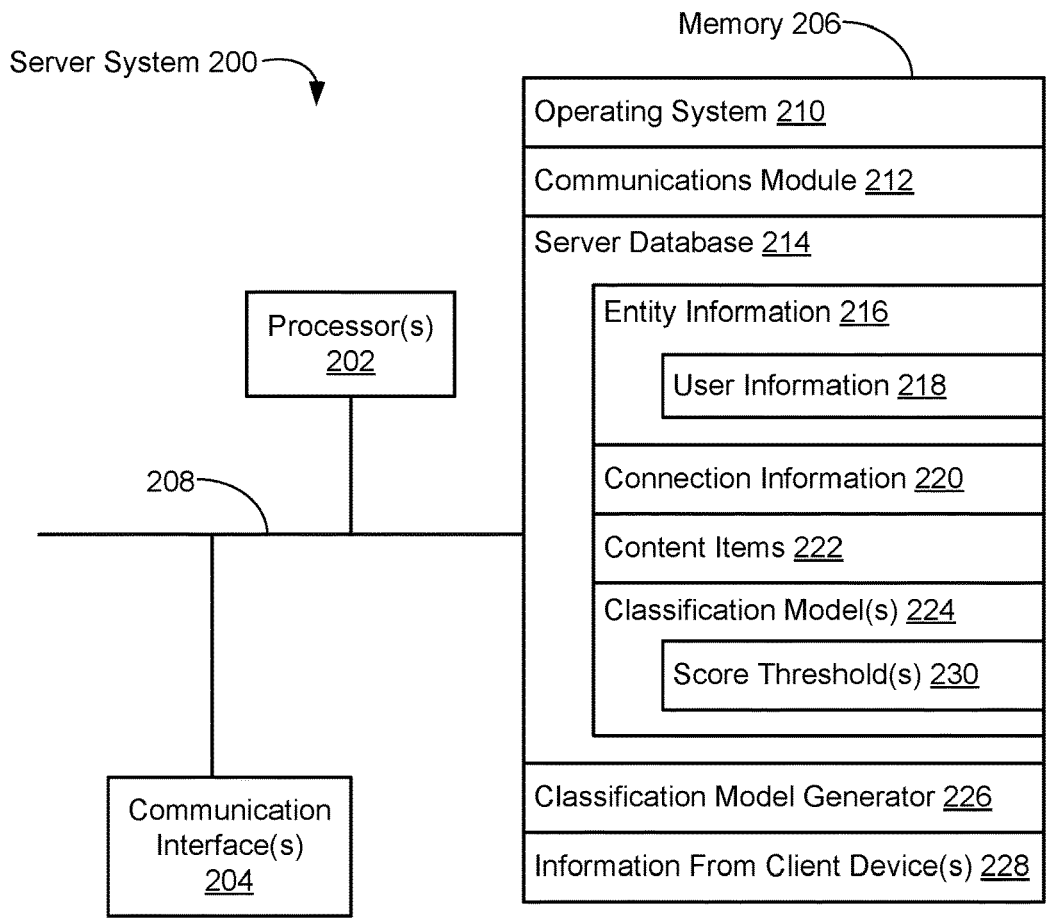
FIG. 2 is a block diagram illustrating an exemplary server system, in accordance with some embodiments.

FIG. 2 is a block diagram illustrating an exemplary server system 200 in accordance with some embodiments. In some embodiments, the server system 200 is an example of a social networking system 108. The server system 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The server system 200 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules, and data structures, or a subset or superset thereof:
- an operating system 210 that includes procedures for handling various basic system services and for performing hardware dependent tasks;
- a network communication module 212 that is used for connecting server system 200 (e.g., social networking system 108, FIG. 1) to other computers (e.g., client devices 104-1, 104-2, . . . 104-n, and/or third party servers) via the one or more communication network interfaces 204 (wired or wireless) and one or more communication networks, such as the Internet, cellular telephone networks, mobile data networks, other wide area networks, local area networks, metropolitan area networks, and so on;
- a server database 214 for storing data associated with the social networking service, such as:
  - entity information 216, such as user information 218 (e.g., age of user, gender of user, account age of user, etc.);
  - connection information 220; and
  - user content items 222;
- classification model(s) 224;
- classification model generator 226; and
- information from one or more client devices 228 (e.g., scores and metadata for content items).

The server database 214 stores data associated with the server system 200 in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, user profile pictures, other pictures associated with the user (e.g., images where the user has been tagged or identified by image analysis software), a plurality of icons, login information, payment credentials (e.g., credit-card or debit-card information, bank information, etc. for conducting financial transactions through the social networking service), privacy and other preferences, biographical data, and the like. In some embodiments, for a given user, the user information 218 includes the user's name, profile picture, a plurality of icons, contact information, birth date, sex, marital status, family status, employment, education background, preferences, interests, and/or other demographic information. In some embodiments, the user information may include other information, such as likes and comments, associated with say, profile pictures of the user (or other photos of the user).

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. For example, entity information 216 may include a location tag (e.g., Lake Tahoe, Calif., USA) for one or more digital photos. In some embodiments, the resource is located in the social networking system 108 (e.g., in content items 222) or on an external server, such as a third-party server (not shown).

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes (e.g., also referred to herein as a contact).

In some embodiments, an edge includes or represents one or more data objects or attributes that correspond to the relationship between a pair of nodes. For example, when a first user indicates that a second user is a "friend" of the first user, the social networking system 108 transmits a "friend request" to the second user. If the second user confirms the "friend request," the social networking system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information 220 about a particular action or activity performed by a user of the user node towards the other entity node. For example, a user may "like" or have "attended," "played," "listened," "cooked," "worked at," "watched," etc. the entity at the other node. The page in the social networking service that corresponds to the entity at the other node may include, for example, a selectable "like," "check in," "add to favorites," etc. icon. After the user clicks one of these icons, the social networking system 108 may create a "like" edge, "check in" edge, a "favorites" edge, etc. in response to the corresponding user action. As another example, the user may listen to a particular song using a particular application (e.g., an online music application). In this case, the social networking system 108 may create a "listened" edge and a "used" edge between the user node that corresponds to the user and the entity nodes that correspond to the song and the application, respectively, to indicate that the user listened to the song and used the application. In addition, the social networking system 108 may create a "played" edge between the entity nodes that correspond to the song and the application to indicate that the particular song was played by the particular application.

In some embodiments, content items 222 include text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content items 222 include executable code (e.g., script for API calls), podcasts, links, and the like. In some embodiments, content items 222 further include generated content (e.g., generated content 600, FIG. 6A).

In some embodiments, the classification model(s) 224 includes past and present models for evaluating generated content (e.g., a souvenir (e.g., a collage) created for a user of the social networking service). In some embodiments, the classification model(s) 224 include one or more score thresholds 230. In some embodiments, the one or more score thresholds 230 are set by the server system 200 and may be updated by the server system 200 based, at least in part, on information received from a client device. The one or more score thresholds 230 and the classification models 224 are discussed in further detail below with reference to FIGS. 4A-4D.

In some embodiments, the classification model generator 226 may generate the classification model(s) 224. In some embodiments, the server system may generate a classification model 224 (e.g., a score threshold and other thresholds/criteria) based, at least in part, on information received from a client device.

In some embodiments, the server system 200 receives information from one or more client devices 228. In some embodiments, the server system 200 may use one or more portions of the information 228 to update and/or generate the classification model(s) 224.

Figure 3:
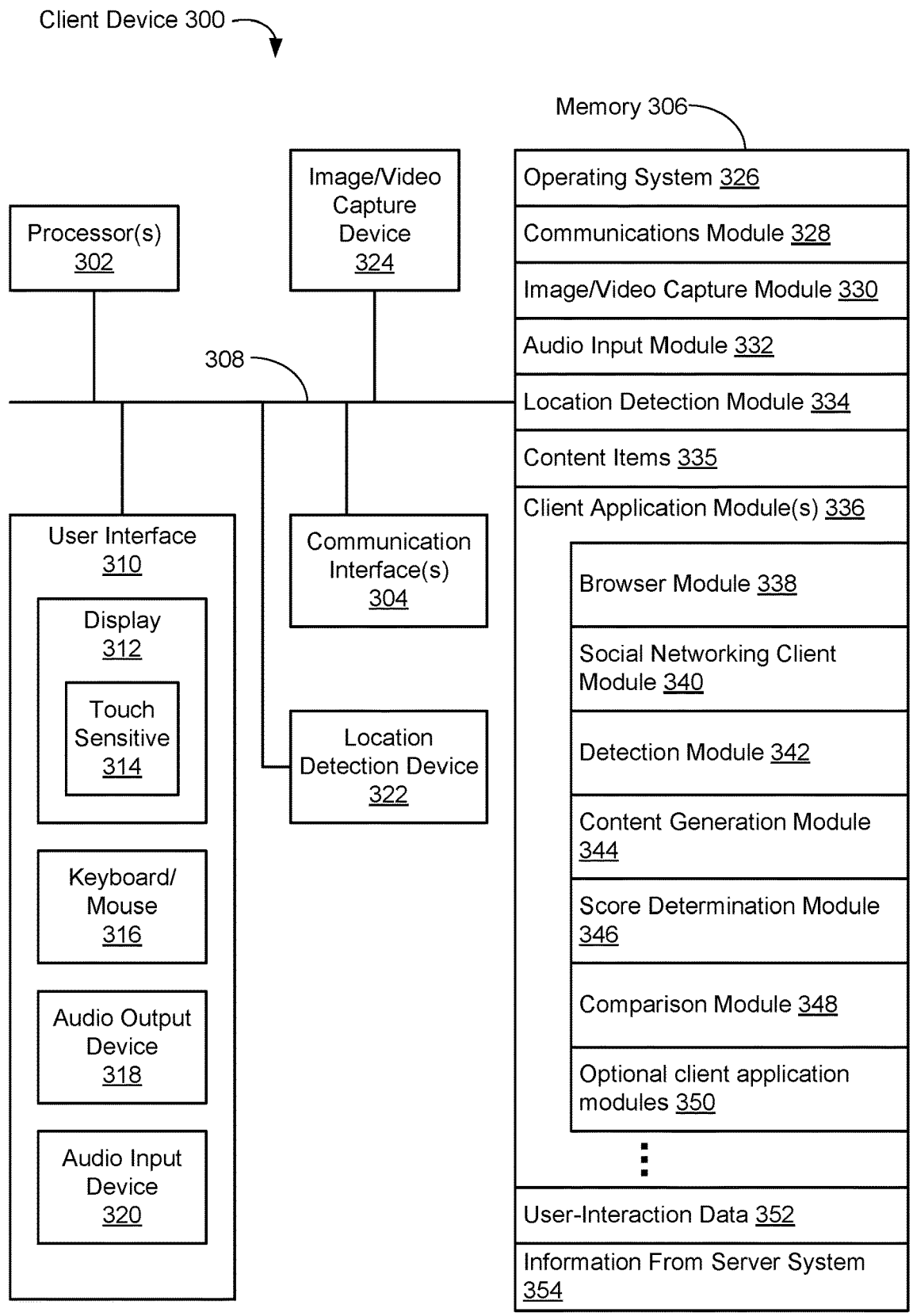
FIG. 3 is a block diagram illustrating an exemplary client device, in accordance with some embodiments.

FIG. 3 is a block diagram illustrating an exemplary client device 300, in accordance with some embodiments. The client device 300 is an example of the one or more client devices 104-1, 104-2, . . . 104-n (FIG. 1). The client device 300 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 300 includes a user interface 310. The user interface 310 typically includes a display device 312. In some embodiments, the client device 300 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., continuous gestures in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 300 use a microphone and voice recognition to supplement or replace the keyboard. Optionally, the client device 300 includes an audio input device 320 (e.g., a microphone) to capture audio (e.g., speech from a user). Optionally, the client device 300 includes a location detection device 322, such as a GNSS (e.g., GPS, GLONASS, etc.) or other geo-location receiver, for determining the location of the client device 300. The client device 300 also optionally includes an image/video capture device 324, such as a camera and/or a webcam.

In some embodiments, the client device 300 includes one or more optional sensors (e.g., gyroscope, accelerometer) for detecting motion and/or a change in orientation of the client device. In some embodiments, the detected motion and/or orientation of the client device 300 (e.g., the motion/change in orientation corresponding to a user input produced by a user of the client device) is used to manipulate an interface (or content within the interface) displayed on the client device 300. In some embodiments, the one or more optional sensors may include an optical projection sensor for projecting an interface displayed on the client device 300 in 3D (e.g., project 3D hologram). Moreover, a user may manipulate the interface displayed on the client device 300 by interacting with the projected holographic 3D display.

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules, and data structures, or a subset or superset thereof:

- an operating system 326 that includes procedures for handling various basic system services and for performing hardware dependent tasks;
- a network communication module 328 that is used for connecting the client device 300 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social networking system 108;
- an audio input module 332 (e.g., a microphone module) for processing audio captured by the audio input device 320, where the respective audio may be sent or streamed (e.g., by a client application module 336) to the social networking system 108;

a location detection module 334 (e.g., a GPS, Wi-Fi, or hybrid positioning module) for determining the location of the client device 300 (e.g., using the location detection device 322) and providing this location information for use in various applications (e.g., social network client module 340);

one or more content items 335 (e.g., text (e.g., ASCII, SGML, HTML), images (e.g., jpeg, tif and gif), graphics (e.g., vector-based or bitmap), audio, video (e.g., mpeg), other multimedia, and/or combinations thereof); and one or more client application modules 336, including the following modules (or sets of instructions), or a subset or superset thereof:

a web browser module 338 (e.g., Internet Explorer or Edge by Microsoft, Firefox by Mozilla, Safari by Apple, or Chrome by Google) for accessing, viewing, and interacting with web sites;

a social networking module 340 for providing an interface to a social networking service (e.g., a social networking service provided by social networking system 108) and related features, and for loading (e.g., within the interface for the social network module 340) pages associated with third-party service providers (e.g., to conduct transactions with the third-party service providers); and/or a detection module 342 for detecting content items on the client device 300 (e.g., detecting images in a photo application on the client device 300);

a content generation module 344 for generating content (e.g., a collage of images) from the detected content items (e.g., select a set of content items from the detected content items);

a score determination module 346 for determining a score associated with the generated content;

a comparison module 348 for comparing the generated content (e.g., the score associated with the generated content) with a criterion (e.g., a score threshold) provided by a server system (e.g., the server system 200); and optional client application modules 350, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D gaming, virtual reality, electronic book reader, and/or workout support;

user-interaction data 352 (e.g., data associated with user interaction with content generated by the client device); and information from a server system 354 (e.g., server system 200) such as one or more classification models and user-specific data for a respective user of the social networking service from the server system.

In some embodiments, the location detection module 334 may attach a location to an image captured by the client device 300. For example, if a user 102 of the client device 300 captures an image while in San Francisco, Calif., the client device 300 will attach the location to the captured image (e.g., San Francisco, Calif., will be attached).

In some embodiments, the one or more content items 335 include metadata. For example, images may include metadata such as time, location (e.g., GPS coordinates), and other metadata associated with capturing the image (e.g., shutter speed, film speed, camera type, focal length, etc.).

Although not shown, the client device 300 may also include an image analysis module that operates upon images (or videos) detected by the client device 300 to identify and/or track subjects (e.g., people, pets, and other objects) in the images. In addition, the image analysis module may determine a quality of an image (e.g., determine exposure and blurriness of an image).

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

FIGS. 4A-4D are flow diagrams illustrating a method 400 of generating content for a user of a social networking service in accordance with some embodiments. The steps of the method 400 may be performed by any combination of client device (e.g., a client device 104, FIG. 1; client device 300, FIG. 3) and/or social networking system (e.g., social networking system 108, FIG. 1; server system 200, FIG. 2). FIGS. 4A-4D correspond to instructions stored in a computer memory or computer-readable storage medium (e.g., memory 206 of the server system 200; memory 306 of the client device 300). For example, the operations of method 400 are performed, at least in part, by a social networking server module (e.g., social networking server module 226, FIG. 2) and/or client application modules (e.g., client application modules 336, FIG. 3).

In some embodiments, one or more of the following steps (e.g., operations) of the method 400 may be performed in an application for a social networking service (e.g., in an application executing on the client device 300). In addition, to assist with describing the method 400, the method 400 will be described with reference to the exemplary GUIs illustrated in FIGS. 5, 6A-6B, and 7.

In performing the method 400, the client device may receive (402) a classification model from a server system (e.g., server system 200, FIG. 2) associated with the social networking service. In some embodiments, the client device may use the classification model when generating content. For example, the client device may generate a personalized collage that includes a set of images associated with a user (e.g., users 102-1, 102-2, . . . 102-n, FIG. 1) of the social networking service. Thereafter, the client device may evaluate the generated collage using the classification model. In some embodiments, the classification model includes a criterion (404). For example, the client device may evaluate the generated collage using the criterion (e.g., determine whether or not the generated collage satisfies the criterion). In some embodiments, the criterion is a score threshold (406). The criterion and the score threshold are discussed in further detail below.

In performing the method 400, the client device may detect (408) content items (e.g., content items 335, FIG. 3) stored on the client device (e.g., stored in memory 306, FIG. 3) independently of the application. For example, referring to FIG. 5, a client device 502 (e.g., client device 300, FIG.

3) may detect content items (e.g., content items 506-1, 506-2, 506-3, etc.) stored in an application 504 on the client device 502 (e.g., a photo management application). In some embodiments, the detected content items (e.g., images, videos, audio files, and the like) may be associated with a user of the social networking service. In some embodiments, the detected content items may include a first plurality of content items (e.g., content items 506-1, 506-2, etc.), a second plurality of content items, (e.g., content items 508-1, 508-2, etc.), a third plurality of content items (e.g., content items 510-1, 510-2, etc.), and so on. In some embodiments, respective pluralities of content items may be identified by metadata associated with the respective content items in the respective pluralities of content items (e.g., the first plurality of content items may have location metadata for location X, the second plurality of content items may have location metadata for location Y, and so on). Metadata is discussed in further detail below.

In some embodiments, the client device may receive (410) user-specific data for a user of the social networking service from the server system. In some embodiments, the user-specific data may include age of the user, gender of the user, and/or account age of the user. In addition, the user-specific data may include activity data for the user (e.g., activity on the social networking service). For example, the activity data may include time elapsed since last feedback (e.g., time elapsed since last like, comment, share, and/or re-share on the social networking by the user). In addition, the activity data may include a quantity of feedback provided by the user over a period of time (e.g., number of likes provided by the user over the last year). Moreover, the activity data may further include time elapsed since last post (e.g., link post, video post, text post, location post, etc.), new friendship, tag (e.g., user identified in an image, user identifier in another post, user identified in a location, etc.), and/or reaction on the social networking by the user. Furthermore, the activity data may further include interaction data with previously generated and/or presented content by the user.

In performing the method 400, the client device may generate (412) content for the user of the social networking service that includes a set of content items from the detected content items, based at least in part on metadata for the set of content items (e.g., metadata for content items 335, FIG. 3). The metadata for the set of content items may be stored at the client device. For example, referring to FIG. 6A, the generated content 600 includes a set of content items (e.g., content items 506-1, 506-3, 506-4, 506-6, and 506-7) from a first plurality of content items (e.g., content items 506-1, 506-2, 506-3, etc.). In addition, the client device may arrange the set of content items in the generated content 600 in a first arrangement (e.g., the client device may increase (or decrease) heights and widths of the content items and may position the content items at various positions). In another example, referring to FIG. 6B, the generated content 610 includes a set of content items (e.g., content items 508-1, 508-2, 508-3, 508-5, and 508-6) from a second plurality of content items (e.g., content items 508-1, 508-2, 508-3, etc.). In addition, the client device may arrange the set of content items in the generated content 610 in a second arrangement.

In some embodiments, the metadata for the set of content items (and the detected content items) includes time metadata. The time metadata for the detected content items (e.g., content items 506-1, 506-2 . . . 510-2, FIG. 5) may include respective timestamps for the set of content items. In some embodiments, the client device may determine that a set of content items from the detected content items have respective timestamps within a specific range of each other (e.g., within a 5-hour period, within a 24-hour period, etc.). In this way, the client device may determine that the set of content items are related based on time of creation.

In some embodiments, the client device may determine one or more time statistics for the set of content items included in the content (e.g., mean timestamp for the set of content items included in the content, a standard deviation for the timestamps of the set of content items included in the content, a range of timestamps included in the content, etc.). In some embodiments, the specific range, which may be included in the classification model, may be associated with at least one of the one or more time statistics. Accordingly, the client device, when generating content that includes the set of content items from the detected content items, may include a set of content items having time metadata that satisfies the specific range.

In some embodiments, the client device may determine that two or more content items are duplicates (or are substantially duplicates) based on respective timestamps for the one or more content items. For example, referring to FIG. 5, images 506-1 and 506-2 may have been captured in a burst (e.g., two or more images captured within a specific period of time). The client device may mark the two or more content items as duplicates (e.g., mark images 506-1 and 506-2 as duplicates). In this way, the client device may include one of the two or more content items in the generated content but not the other (e.g., image 506-1 is included in the generated content 600 and image 506-2 is not included).

In some embodiments, the metadata for the set of content items (and the detected content items) includes location metadata. The location metadata for the set of content items may include respective location tags for the set of content items. For example, a content item may have a location tag associated with the content item (e.g., the client device may attach GPS or other geolocation coordinates to the content item (e.g., an image and/or video) when captured by the client device). The client device may thereafter associate the GPS or other geolocation coordinates with a location (e.g., GPS or other geolocation coordinates may be associated with a winery in Napa, Calif., USA). In some embodiments, the client device may determine that the set of content items are related based on respective location tags associated with the set of content item.

In some embodiments, the client device may determine one or more location statistics for the set of content items included in the content based on the location metadata (e.g., a mean location (e.g., a latitude mean and a longitude mean), a standard deviation (e.g., a latitude standard deviation and a longitude standard deviation) for the location tags of the set of content items included in the content, etc.). In some embodiments, the classification model may include a threshold (e.g., a threshold range) that is associated with at least one of the one or more location statistics. Accordingly, the client device, when generating content that includes the set of content items from the detected content items, may include a set of content items having location metadata that satisfies the threshold. In some embodiments, a scope of the threshold may vary depending on a nature of the location (e.g., rural areas may have a greater expansion relative to expansion in urban areas, or vice versa).

In some embodiments, the client device, when generating content that includes the set of content items from the detected content items, may include a set of content items having location metadata that satisfies the threshold and timestamps that satisfy the specific range.

In some embodiments, the location metadata may further include landmark metadata. For example, a content item may have a location tag associated with the content item (e.g., GPS or other geolocation coordinates). The client device may associate the GPS or other geolocation coordinates with a landmark. For example, the GPS or other geolocation coordinates may be associated with the Golden Gate Bridge, Central Park, the Grand Canyon, and the like. In some embodiments, the classification model may favor content items with landmark metadata. Accordingly, the client device may modify (e.g., adjust) respective weights for content items that include landmark metadata to increase a likelihood of the content items being included in the set of content items. In some embodiments, the classification model may limit a number of content items included in the set of content items that include landmark metadata.

In some embodiments, the metadata for the set of content items includes data indicating user modification. For example, a user may edit (e.g., adjust contrast, exposure, crop, etc.) an image at some point after capturing an image using a photo management application or another application. In some embodiments, the classification model may favor content items with data indicating user modification. Accordingly, the client device may modify respective weights of content items that include metadata indicating user modifications to increase a likelihood of the content items being included in the set of content items.

In some embodiments, the client device may identify a cluster of content items (e.g., content items 510-1 and 510-2) based on data indicating user modification of the content items. For example, a user may edit one or more images and/or delete one or more images to form a cluster of images. The client device may generate content (e.g., a collage of images) using the formed cluster of images.

In some embodiments, the metadata for the set of content items includes data indicating capture method. The data indicating capture method may include metadata associated with a capture source. For example, the capture source may be a mobile device (e.g., client device 300), a digital camera (e.g., digital single-lens reflex (DSLR) camera), and the like. In addition, the classification model may favor content items captured by a first capture source over content items captured by a second capture source. For example, a user may take one or more photos with using a DSLR camera (i.e., the first capture source) during a trip and may send the one or more photos to his or her client device (e.g., the client device 300). As such, the client device may modify respective weights of content items that include metadata indicating the first capture source (e.g., the DSLR camera) to increase a likelihood of the content items (e.g., the one or more photos) being included in the set of content items.

In some embodiments, the data indicating capture method may include metadata for media type. For example, the media type may be an image (e.g., jpeg, tif, gif, etc.), a video (e.g., mpeg, mp4, etc.), an audio file, and the like. In some embodiments, the classification model may favor content items that are a first media type (e.g., metadata for media type such as jpeg, tif, gif, etc.). In some embodiments, the classification model may favor content items that are a second media type (e.g., metadata for media type such as mpeg, mp4, etc.). In some embodiments, the classification model may favor a combination of the first and second media types.

In some embodiments, the metadata for the set of content items may include one or more quality measures. In some embodiments, the client device may determine quality metrics for the respective content items of the detected content items based on the one more quality measures. In addition, in some embodiments, the client device may determine the quality metrics for respective content items of the detected content items using an image analyzing program. Those skilled in the art will appreciate that various image analyzing programs may be used to analyze the detected content items.

In some embodiments, the one or more quality measures include whether a content item (e.g., an image, a video, etc.) is in focus (e.g., a blurriness measure). In some embodiments, the client device may analyze (e.g., analyze metadata indicating blurriness, such as focal length, aperture, film speed, shutter speed and/or analyze using the image analyzing program) the detected content items for blurriness and may determine one or more blurriness statistics (e.g., metrics) for the set of content items included in the content (e.g., a mean for the blurriness measure, a standard deviation for the blurriness measure, a range for the blurriness measure, etc.). In some embodiments, when generating the content, the client device may include respective content items in the generated content that satisfy a threshold blurriness measure. In some embodiments, the classification model may include the threshold blurriness measure (i.e., the classification model may favor content items that are in focus as opposed to content items that are out of focus). In some embodiments, the threshold blurriness measure is associated with at least one of the one or more blurriness statistics (e.g., the threshold blurriness measure may be associated with a mean for the blurriness measure). In some embodiments, the client device may modify (e.g., adjust) respective weights for content items that satisfy the threshold blurriness measure to increase a likelihood of the content items being included in the set of content items.

In some embodiments, the one or more quality measures include whether a content item (e.g., an image) is properly exposed (e.g., a darkness measure). In some embodiments, the client device may analyze (e.g., analyze metadata indicating exposure and/or analyze using the image analyzing program) the detected content items for darkness and may determine one or more darkness statistics (e.g., metrics) for respective content items of the set of content items included in the content (e.g., a mean for the darkness measure, a standard deviation for the darkness measure, a range for the darkness measure, etc.). In some embodiments, when generating the content, the client device may include respective content items in the generated content that satisfy a threshold darkness measure. In some embodiments, the classification model may include the threshold darkness measure (e.g., the classification model may favor content items that are properly exposed as opposed to content items that are improperly exposed). In some embodiments, the threshold darkness measure is associated with at least one of the one or more darkness statistics (e.g., the threshold darkness measure may be associated with a mean for the darkness measure). In some embodiments, the client device may modify respective weights for content items that satisfy the threshold darkness measure to increase a likelihood of the content items being included in the set of content items.

In some embodiments, the client device may determine other metrics for respective content items of the detected content items using the image analyzing program. For example, the other metrics may include whether a content item (e.g., an image) is a portrait. A portrait may be an image with a subject that satisfies (e.g., fills) a first threshold percentage of the photograph but does not exceed (e.g., fill) a second threshold percentage (e.g., a close-up image of the subject). In some embodiments, the classification model may favor content items, at least for some of the set of content items included in the content, which are portrait images. Accordingly, the client device may modify (e.g., adjust) respective weights of content items that are portrait images to increase a likelihood of the content items being included in the set of content items.

In some embodiments, the metadata may include whether a content item (e.g., an image) is marked as a favorite content item by the user and whether a content item is marked as a hidden by the user. In some embodiments, the classification model may favor, at least for some of the set of content items included in the content, content items marked as favorites. Accordingly, the client device may modify (e.g., adjust) respective weights of content items marked as favorites by a user to increase a likelihood of the content items being included in the set of content items. In addition, the metadata may include other generated content information. The other generated content information may include respective pixel heights and widths for the set of content items, total pixel count, video duration, video count, photo count, and/or face count per content item. In some embodiments, the classification model may include respective thresholds for the other generated content information (e.g., a threshold photo count, a threshold video count, etc.).

In some embodiments, the metadata for the set of content items (and metadata for the detected content items) are selected from the group consisting of time (e.g., the time metadata), location (e.g., the location metadata), the data indicating user modifications, the data indicating capture method, the one or more quality measures, and the other metrics (414).

In some embodiments, when generating the content for the user, the client device may generate (416) the content further based at least in part on the user-specific data. For example, user-specific data for a first user may indicate that the first user is a twenty-one year old male and user-specific data for a second user may indicate that the second user is a sixty-five year old female. The client device, when generating content for the first user, may include a set of content items in the generated content using a first classification model. For example, the first classification model may be geared towards a first group of users and the first user may fit within the first group of users. By contrast, the client device, when generating content for the second user, may include a set of content items in the generated content using a second classification model (e.g., geared towards a second group of users). However, the client device may determine overtime (e.g., after providing several iterations of content to the first and second users) that the first user and the second user have similar participation patterns and preferences on the social networking service. Consequently, the first and second classification models may become similar overtime.

Figure 5:
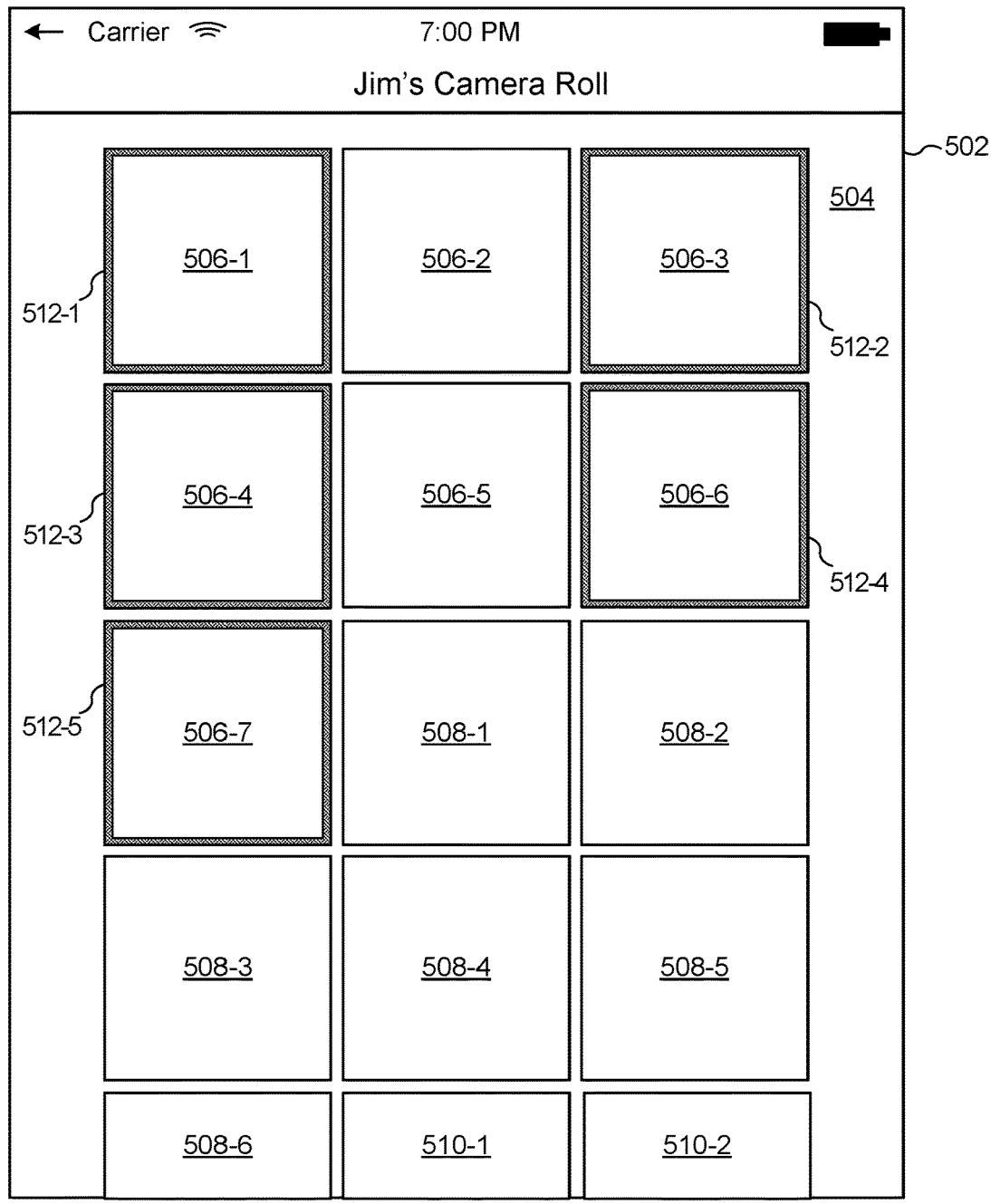
FIG. 5 illustrates an exemplary graphical user interface (GUI) of content items on a client device of a user of a social networking service.

In some embodiments, when generating the content for the user, the client device may select (418) the set of content items from the detected content items. Referring to FIG. 5, the client device may select a set of content items (e.g., selection 512-1, 512-2, 512-3, 512-4, and 512-5 of content items 506-1, 506-3, 506-4, 506-6, and 506-7, respectively) from the first plurality of content items (e.g., content items 506-1, 506-2, 506-3, etc.) to generate the content for the user (e.g., generated content 600, FIG. 6A). In addition, the client device may select the set of content items based at least in part on the metadata for the set of content items as discussed above with reference to generating the content (step 412).

In some embodiments, when selecting the set of content items, the client device may select (420) respective content items of the detected content items that are associated with an event. In some embodiments, an event may be defined based, at least in part, on time metadata and/or location metadata for a plurality of content items. For example, the client device may determine that a first plurality of content items (e.g., content items 506-1, 506-2, 506-3, etc.) of the detected content items stored on the client device is associated with a first event (e.g., Weekend trip to Napa, Calif., USA). In addition, the client device may determine that a second plurality of content items (e.g., content items 508-1, 508-2, 508-3, etc.) of the detected content items stored on the client device is associated with a second event (e.g., a day of golfing in Monterey, Calif., USA), and so on (e.g., content items 510-1 and 510-2 may be associated with another event).

Figure 6B:
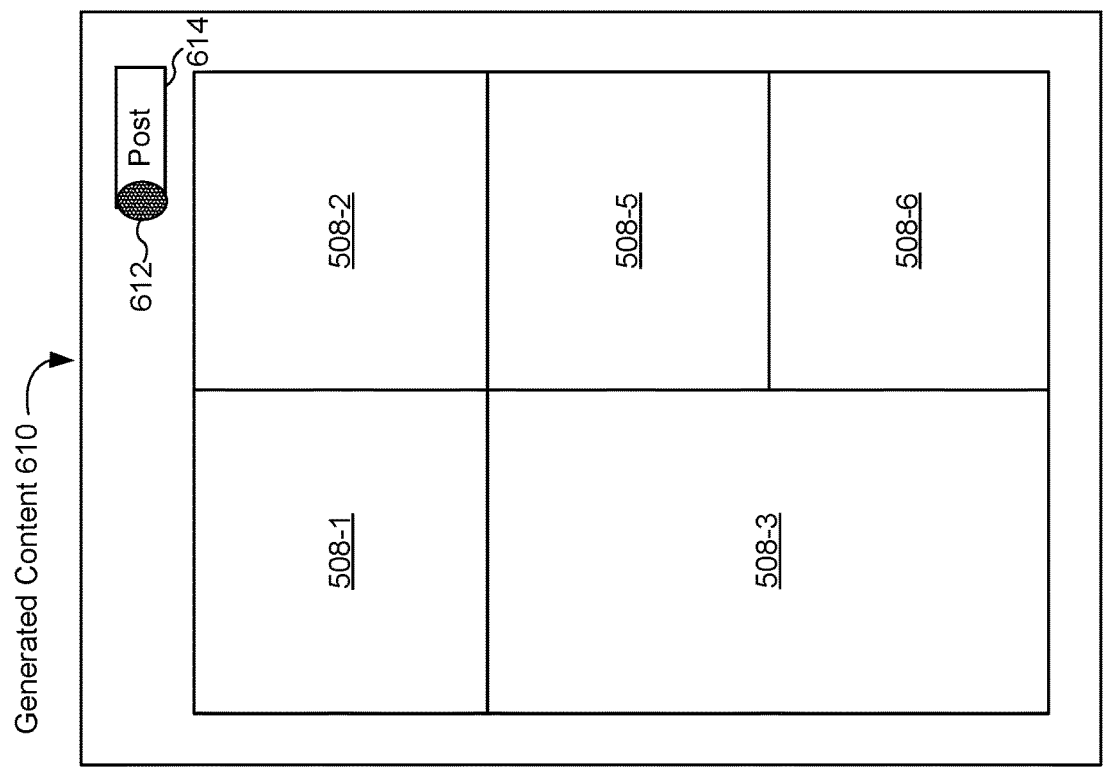
FIGS. 6A-6B illustrate exemplary graphical user interfaces (GUIs) of generated content on a client device of a user of a social networking service.
Figure 6A:
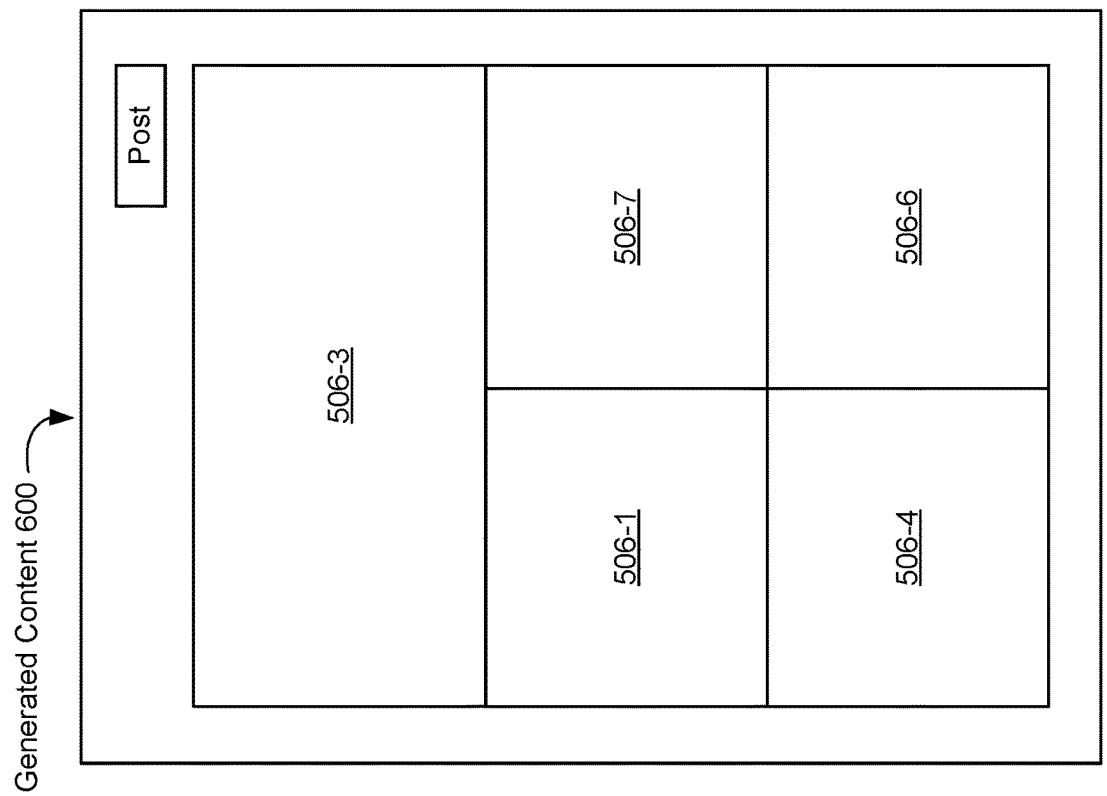
Figure 7:
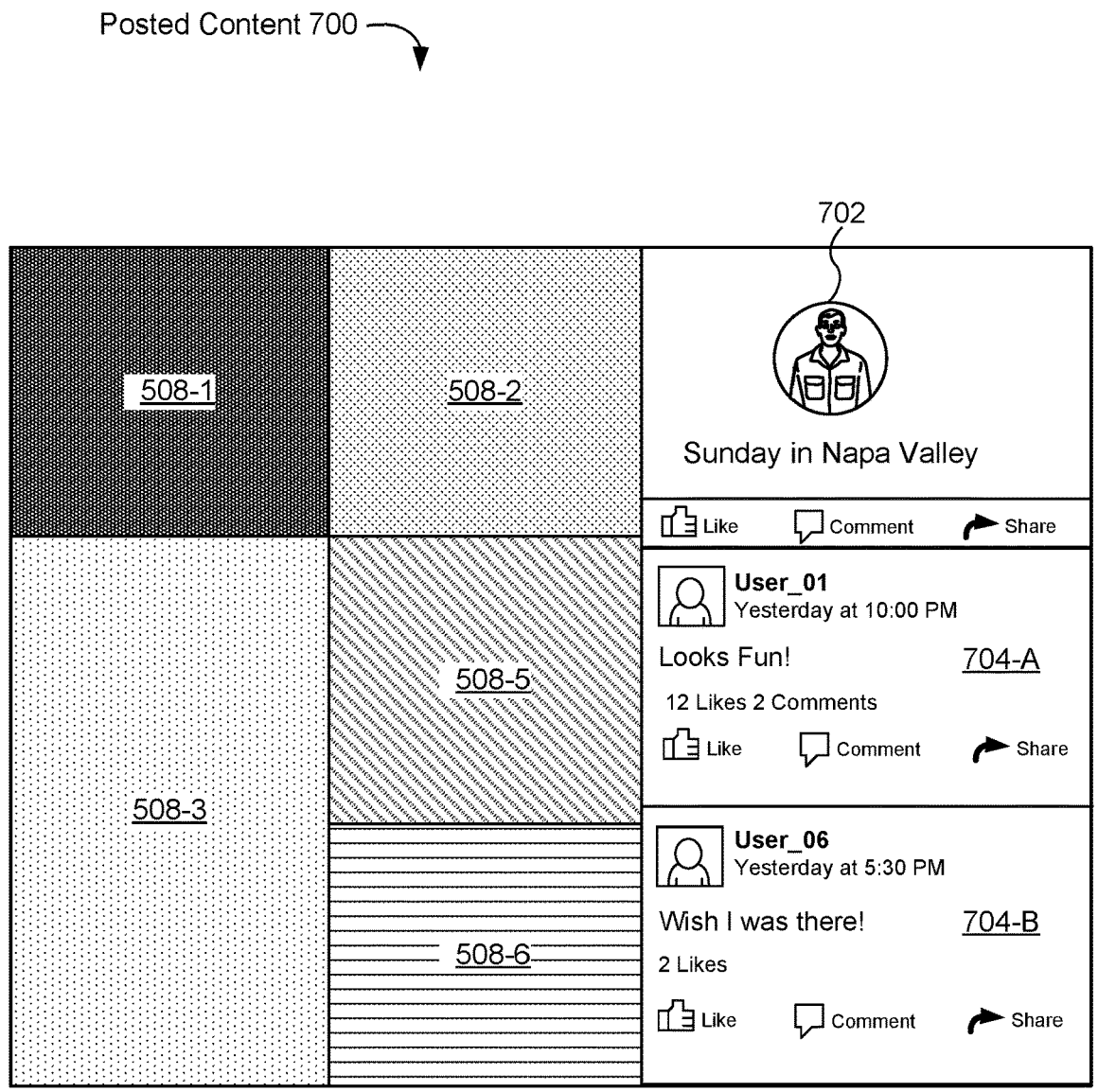
FIG. 7 illustrates an exemplary graphical user interface (GUI) of content posted to a social networking service by a user of the social networking service.

In addition, in some embodiments, the client device may determine (422) a score for the set of content items based at least in part on the metadata for the set of content items (e.g., determine a score for generated content 600, FIG. 6A). In some embodiments, the client device may determine scores for respective content items in the set of content items based at least in part on the metadata for the respective content items (e.g., determine scores for content items 506-1, 506-3, 506-4, 506-6, and 506-7 included in the generated content 600, FIG. 6A). In some embodiments, when determining the score, the client device may use the one or more respective statistics determined for the metadata. For example, the client device may assign a first score to the set of content items based on the one or more time statistics (e.g., a narrow range of timestamps in the set of content items may result in an increased first score relative to a first score resulting from a wide range of timestamps in the set of content items). In another example, the client device may assign a second score to the set of content items based on the one or more location statistics (e.g., a smaller standard deviation in location tags in the set of content items may result in an increased second score relative to a second score resulting from a larger standard deviation in the location tags). In another example, the client device may assign a third score to the set of content items based on the one or more blurriness statistics (e.g., multiple out of focus content items in the set of content items may result in a decreased third score relative to a third score resulting from no out of focus content items in the set of content items). A fourth score may be assigned based on the one or more darkness statistics. In some embodiments, the first, second, third, and fourth scores may be the same score. In some embodiments, one or more of the first, second, third, and fourth scores may be different scores.

Alternatively or in addition, in some embodiments, when determining the score, the client device may use the one or more thresholds included in the classification model. For example, the client device may assign a score to the set of content items when the set of content items have respective timestamps within the specific range included in the classification model. In some embodiments, the score may be modified based on the one or more time statistics. Additional scores may be determined based on the thresholds (e.g., location, blurriness, darkness, etc.).

Alternatively or in addition to the one or more respective statistics and the thresholds included in the classification model, in some embodiments, the client device may use the modified weights to determine the score. For example, the client device may assign a score to a set of content items (e.g., the set of content items 506-1, 506-3, 506-4, 506-6, 506-7, FIG. 6A) that includes one or more respective content items with landmark metadata (e.g., content item 506-4 may include landmark metadata). In another example, the client device may assign a score to a set of content items that includes one or more respective content items with data indicating user modification. In another example, the client device may assign a score to a set of content items that includes one or more respective content items with data indicating a first capture source (e.g., content items in generated content 600 may have been captured via a DSLR camera) and the client device may assign no additional score (or assign a reduced score) to a set of content items that includes one or more respective content items with data indicating a second capture source (e.g., content items in generated content 610 may have been captured via a client device), or vice versa. In some embodiments, the client device may assign other scores to a set of content items (or respective content items) based on media type, the blurriness measure, the darkness measure, portrait images, photo count, video count, and the like. In some embodiments, one or more the scores may be the same and/or one or more scores may be different (e.g., weighted).

In some embodiments, the client device may determine (424) the score for the set of content items based at least in part on the received user-specific data. For example, the client device may assign a first score to the set of content items when a user is in a first age group (or is a male) and the client device may assign a second score to the set of content items when a user is in a second age group (or is a female). In some embodiments, the client device may determine the score for the set of content items based at least in part on a combination of the metadata for the set of content items and the received user-specific data. In some embodiments, the client device may determine the score when generating the content for the user. Alternatively, in some embodiments, the client device may determine the score at some point after generating the content for the user. In some embodiments, the client device may normalize the determined score (e.g., make the score out of say, 100, with 100 being a perfect score).

In some embodiments, in accordance with a determination that the generated content for the user does not satisfy a criterion included in the classification model (426—No), the client device may discard (428) the generated content. For example, referring to FIG. 6A, the client device may determine that the generated content 600 does not satisfy the criterion (e.g., a score threshold). In such a case, the client device may discard the generated content 600. In some embodiments, the client device may store (e.g., store selection of the set of content items) the generated content for a period of time (e.g., one month) as opposed to discarding the generated content.

In some embodiments, in accordance with a determination that the generated content for the user satisfies the criterion included in the classification model (426—Yes), the client device may present (430) the content to the user in the application. For example, referring to FIG. 6B, the client device may determine that the generated content 610 satisfies the criterion (e.g., the score threshold). In such a case, the client device may present the generated content 610 to the user. In some embodiments, the content comprises a collage that includes the set of content items (432). In some embodiments, the content is personalized (e.g., a personalized collage).

In some embodiments, the criterion included in the classification model may be based on one or more of the metadata for the set of content items. For example, the criterion may be satisfied when the set of content items included in the content has a timestamp range within a specific range included in the classification model. Alternatively and in addition, the criterion may be satisfied when location tags associated with the set of content items satisfy a threshold included in the classification model. In some embodiments, the criterion may include a landmark criterion. The landmark criterion may be satisfied when the set of content items includes at least one content item with landmark metadata. In some embodiments, the criterion may correspond to any of the one or more time statistics and/or any of the one or more location statistics.

In some embodiments, the criterion included in the classification model may be associated with the one or more quality measures (or the other metrics). For example, the criterion may be satisfied when the set of content items included in the content have a darkness measure (e.g., a mean darkness measure) that satisfies the threshold darkness measure. In another example, the criterion may be satisfied when the set of content items included in the content have a blurriness measure (e.g., a mean blurriness measure) that satisfies the threshold blurriness measure. In some embodiments, the criterion may correspond to any of the one or more blurriness statistics and/or any of the one or more darkness statistics (or any of the other metrics). In some embodiments, in accordance with a determination that the generated content for the user satisfies criteria (e.g., multiple thresholds) included in the classification model, the client device may present the content to the user in the application.

In some embodiments, the criterion is a score threshold. As discussed above, the client device may determine a score for the generated content (steps 422 and 424, FIG. 4A). For example, the client device may assign a first score to the set of content items based on the one or more time statistics, a second score to the set of content items based on the one or more location statistics, and so on. In addition, the client device may assign one or more additional scores based on the data indicating user modification, the capture method, the other metrics, and so on. Accordingly, the client device may present the content to the user in the application in accordance with a determination that the score (e.g., a combination of the first, second, third, fourth, and/or the additional scores) satisfies the score threshold of the classification model.

After presenting the content to the user in the application and in accordance with a determination that the user has interacted (e.g., viewed, posted and/or otherwise shared) with the content within a period of time (434—Yes), the client device may continue (436) to present the content to the user in the application. In addition, the client device may maintain (438) the score of the content. In some embodiments, the client device may continue to track user interactions (or lack thereof) with the content.

After presenting the content to the user in the application and in accordance with a determination that the user has not interacted with the content within the period of time (434—No), the client device may modify (440) (e.g., reduce) the score of the content. For example, referring to FIG. 6B, the score for the generated content 610 may be, say, 70 out of 100 (e.g., the determined score may have been normalized). The client device may reduce the score to, say, 60 in accordance with the determination that the user has not interacted with the content within the period of time. In some embodiments, the client device may provide the score (e.g., the 70 score) and the modified score (e.g., the 60 score) to a server system (e.g., the server system 200). In this way, the server system may consider both scores when updating the classification model (discussed below).

In some embodiments, in accordance with a determination that the modified score for the content still satisfies the score threshold (442—Yes), the client device may continue (444) to present the content to the user in the application. In some embodiments, in accordance with a determination that the modified score for the content no longer satisfies the score threshold (442—No), the client device may cease (446) presenting the content (e.g., the score threshold may be between the score and the modified score).

In some embodiments, the client device may detect (448) a post input for the content from the user (e.g., user selection 612 of button 614, FIG. 6B). The client device, in response to detecting the post input, may post (450) the content to the social networking service. For example, referring to FIG. 7, posted content 700 may include the set of content items 508-1, 508-2, 508-3, 508-5, and 508-6 from the generated content 610. The posted content 700 may include an identifier 702 (e.g., a profile picture) of the user of the social networking service. In some circumstances, the posted content 700 may include one or more interaction sections (e.g., interaction sections 704-A and 704-B). Users of the social networking service (including the user) may interact with the posted content 700 in a variety of ways (e.g., provide feedback to the posted content 700 such as liking, commenting on, and/or sharing the posted content).

In some embodiments, in accordance with a determination that the user has not posted the content within a threshold period of time (452—No), the client device may cease (454) presenting the content. In some embodiments, the client device may flag the presented content in response to the user not posting the content within the threshold period of time. For example, flagging may provide an indication that the presented content was not appealing to the user. In this way, the client device may present future content in a different manner to increase a probability of the presented future content being posted by the user.

In some embodiments, in accordance with a determination that the user posted the content within the threshold period of time (452—Yes), the client device may track (456) user interaction with the posted content.

In some embodiments, the client device may track (458) user interaction with the content over a period of time. For example, prior to the user posting the content on the social networking service, the client device may track interactions by the user with the presented content (e.g., viewing the presented content in the application). Alternatively or in addition, after the user posts the content to the social networking service (e.g., posted content 700, FIG. 7), the client device may track interactions with the posted content by the user and/or interactions by other users of the social networking service (e.g., track likes, comments, and/or shares in one or more interaction sections (e.g., interaction sections 704-A and 704-B, FIG. 7)). In some embodiments, the client device may further track interactions based on location (e.g., country, region, state, city, etc.), age group, sex, platform (e.g., iOS, Android, etc.), time period (e.g., day of the week and/or hour of the day), and the like.

In some embodiments, the client device may log (460) user-interaction data based on the tracked user interaction (e.g., logged in user-interaction data 352, FIG. 3).

In some embodiments, the client device may provide (462) information to the server system (e.g., the server system 200) associated with the generated content. In some embodiments, when providing the information, the client device may provide at least one of the score for the generated content, the metadata for the set of content items, and the logged user-interaction data. In some embodiments, the provided information includes the logged user-interaction data (464). In some embodiments, when providing the information, the client device may provide two or more of the score, the metadata for the set of content items, and the logged user-interaction data. In some embodiments, the server system evaluates the provided information. For example, the server system may evaluate a relationship (e.g., a correlation) between the score for the generated content with the logged user-interaction data (e.g., the posted content may have received an above average score but the posted content may have received below average user interaction). In some embodiments, in accordance with a determination that the logged user-interaction data does not satisfy a user-interaction threshold, the server system may modify the classification model. For example, the server system may adjust (e.g., increase) the score threshold, the criterion, and/or other thresholds included in the classification model. In this way, the server system may increase a threshold for content to be presented to the user (i.e., attempt to increase a quality and/or an appeal of content presented to respective users).

In some embodiments, after providing the information to the server system, the client device may receive (466) an updated classification model including an updated score threshold from the server system in accordance with the provided information. In some embodiments, the updated score threshold is increased based on the providing the information (e.g., increased when the logged user-interaction data does not satisfy a user-interaction threshold). In some embodiments, the updated score threshold is decreased based on the providing the information. For example, the updated score threshold may be decreased when the generated content for the user (or several iterations of generated content) does not satisfy the criterion (e.g., the score threshold) of the classification model. In some embodiments, the updated score threshold is maintained based on the providing the information (e.g., maintained when the logged user-interaction data satisfies the user-interaction threshold).

Alternatively or in addition, the updated classification model may include updated thresholds (e.g., thresholds associated with the statistics, measures, and/or metrics discussed above). For example, the server system may update the threshold for location metadata and/or the specific range for time metadata. In addition, the server system may update the blurriness measure threshold and/or the darkness measure threshold. In some embodiments, the server system may increase or decrease a desired number of content items included in the set of content items that include landmark metadata. Moreover, the updated thresholds may include an updated threshold photo count, an updated threshold video count, and so on.

In some embodiments, the updated classification model may no longer favor one or more previously favored content items. For example, the classification model may favor content items with landmark metadata. However, the updated classification model may no longer favor content items with landmark metadata.

In some embodiments, after providing the information to the server system, the client device may receive (468) updated user-specific data for the user from the server system in accordance with the logged user-interaction data. For example, the updated user-specific data for the user may indicate that the user increased (or decreased) activity on the social networking service.

Figure 4A:
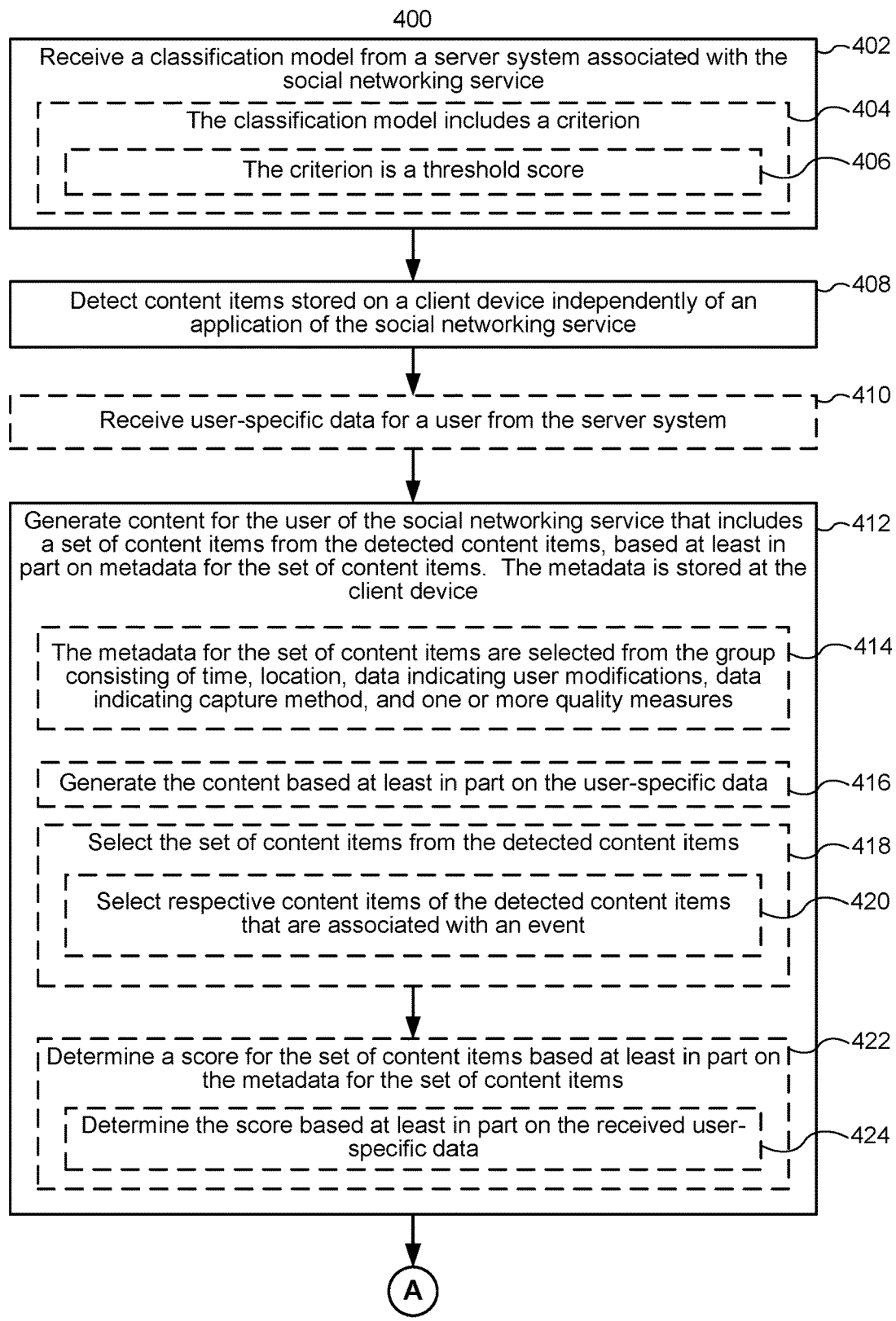
FIGS. 4A-4D are flow diagrams illustrating a method of generating content for a user of a social networking system, in accordance with some embodiments.

In some embodiments, the client device may detect (470) new content items stored on the client device independently of the application. For example, the user of the client device may have a plurality of new images associated with a new event. Detecting content items stored on the client device independently of the application is discussed in further detail above with reference to step 408 (FIG. 4A).

In some embodiments, the client device may generate (472) new content for the user that includes a new set of content items stored on the client device, including at least one of the new content items (e.g., new content may include 506-1, 506-2, 506-3, 506-4, and 506-5). In some embodiments, the new content is generated based at least in part on metadata for the new set of content items and/or the updated user-specific data. Generating content is discussed in further detail above with reference to step 412 (FIG. 4A).

In some embodiments, the new set of content items may include all new content items. For example, the new content may not include content items included in previously generated content.

In some embodiments, the client device may determine (474) a score for the new set of content items based at least in part on the metadata for the new set of content items and the updated user-specific data. Determining a score for generated content is discussed in further detail above with reference to steps 422 and 424 (FIG. 4A).

In some embodiments, in accordance with a determination that the score for the new set of content items does not satisfy the updated score threshold (476—No), the client device may discard (478) the new content.

Figure 4B:
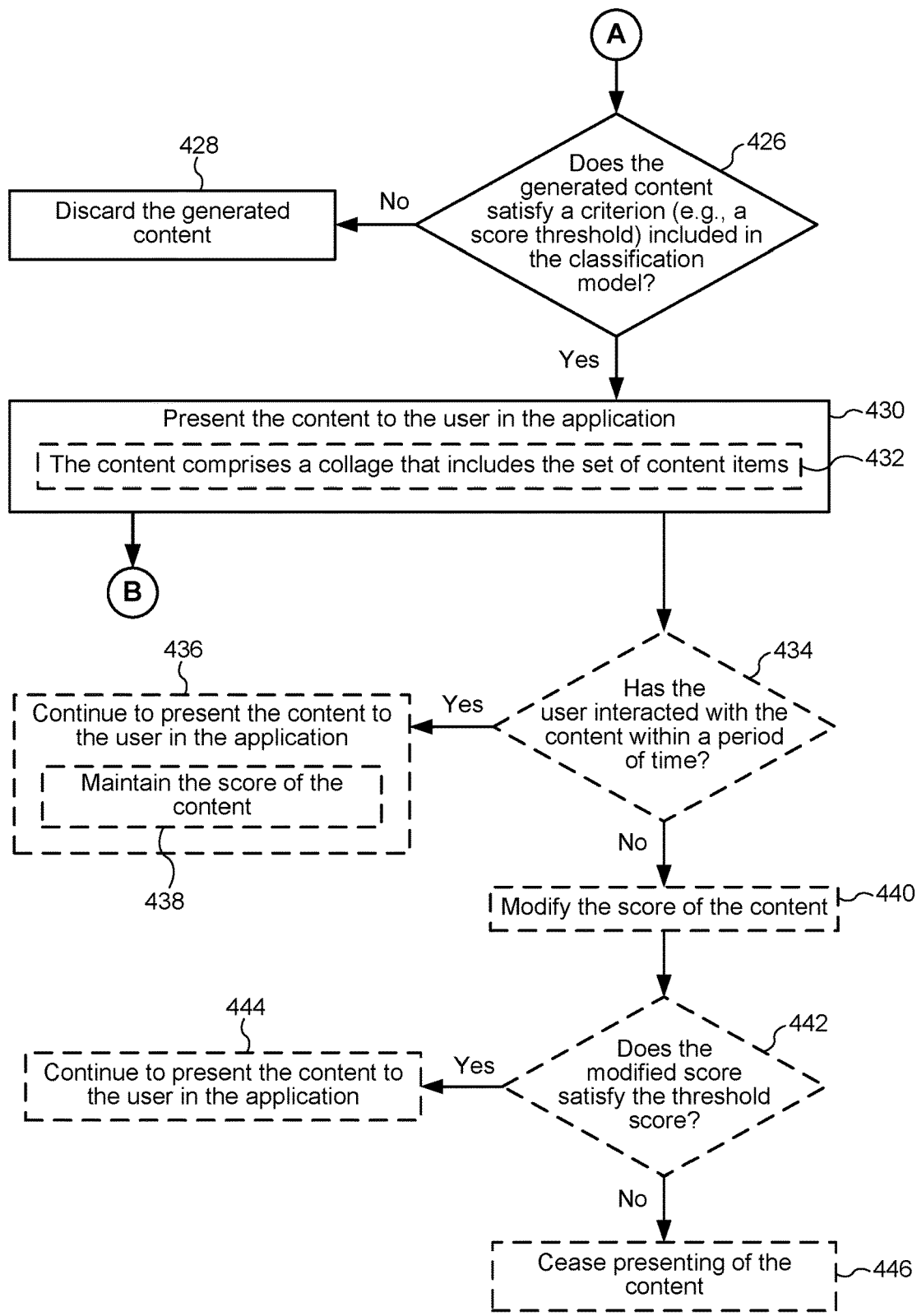
Figure 4C:
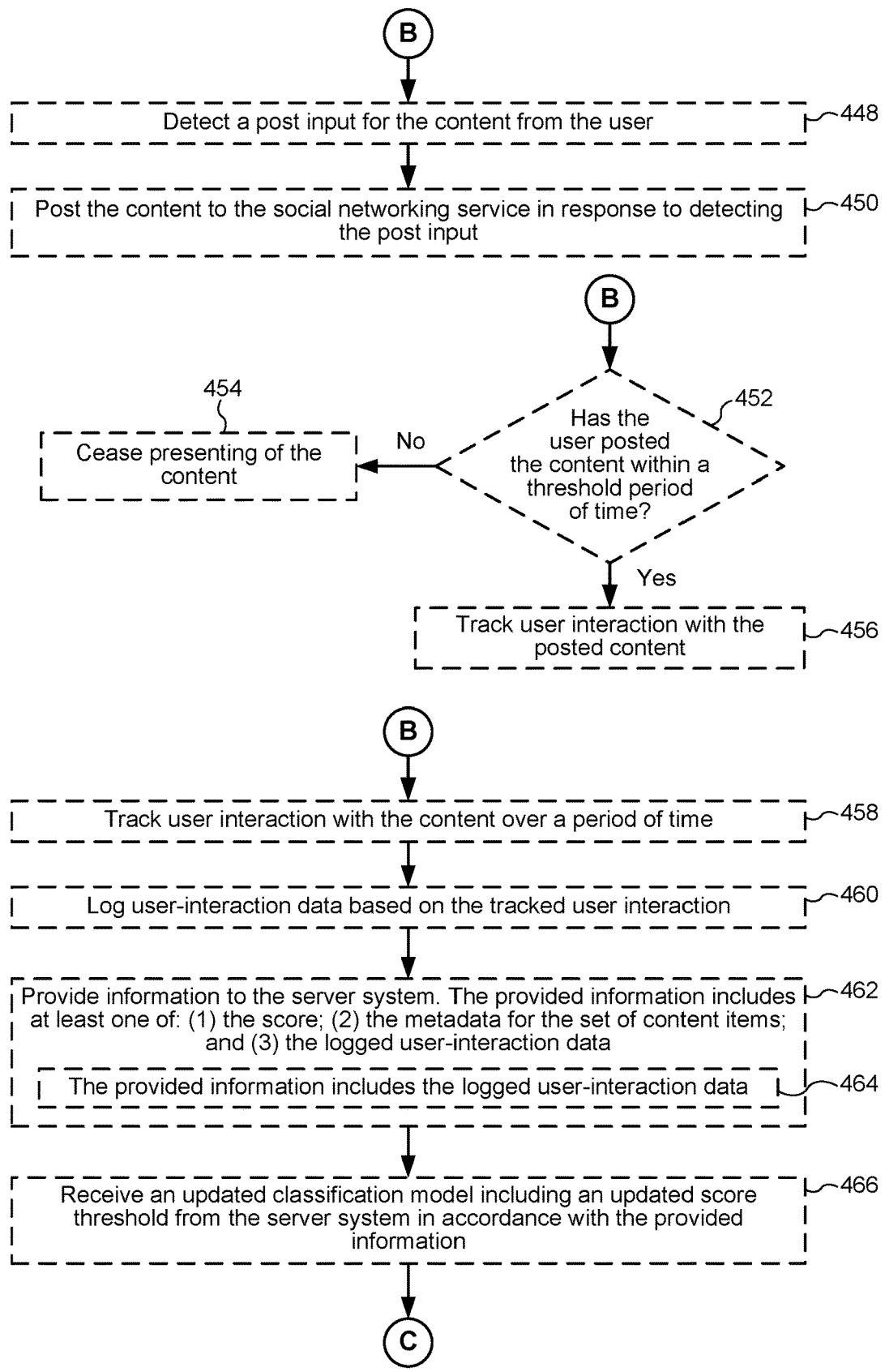
Figure 4D:
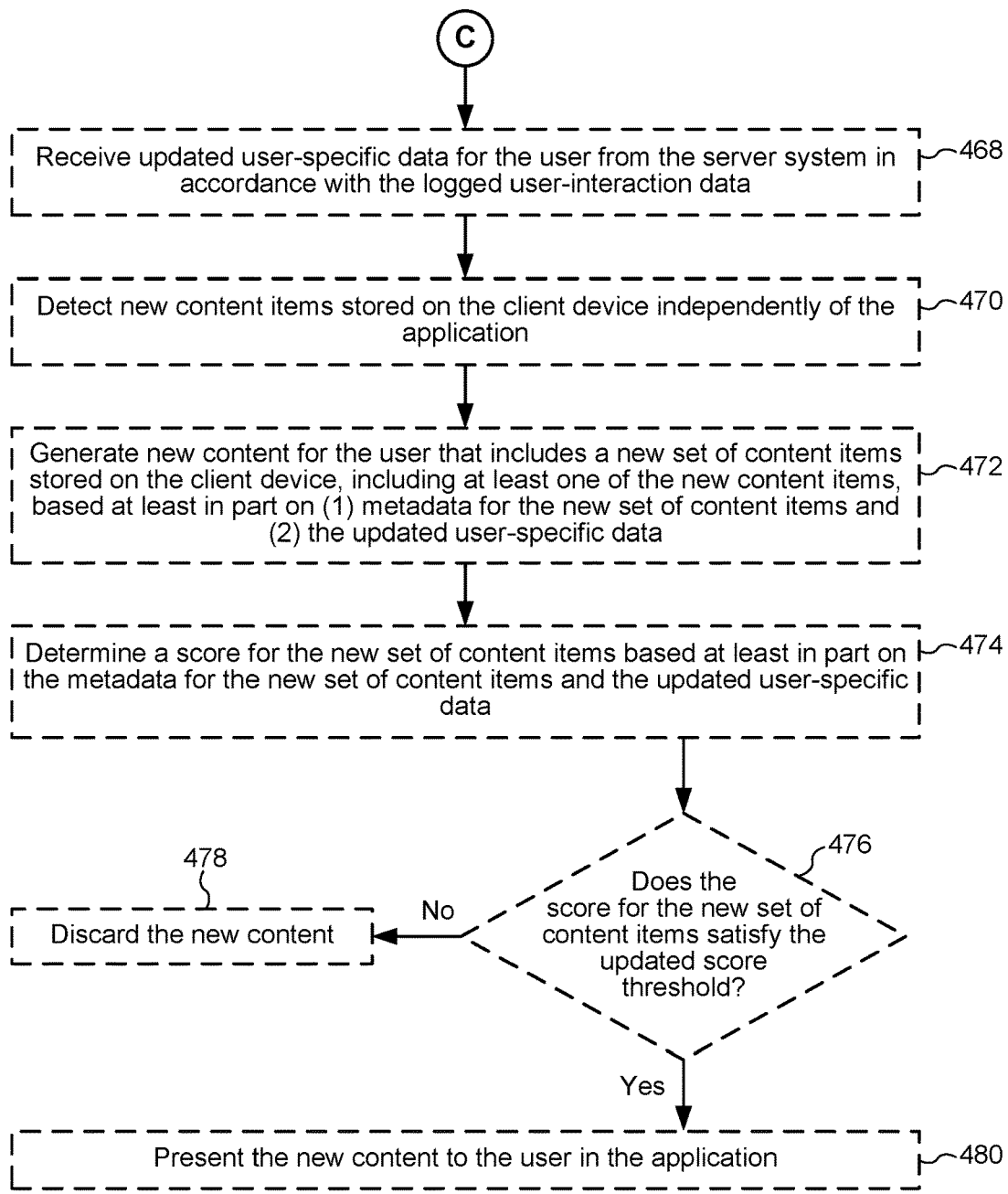

In some embodiments, in accordance with a determination that the score for the new set of content items satisfies the updated score threshold (476—Yes), the client device may present (480) the new content to the user in the application. Presenting generated content is discussed in further detail above with reference to steps 426, 428, and 430 (FIG. 4B).

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at a client device having a display, one or more processors, and memory storing instructions for execution by the one or more processors, in an application of a social networking service:
receiving a classification model from a server system associated with the social networking service, wherein the classification model includes a first criterion for evaluating sets of content items stored on the client device;
generating a collage for a user of the social networking service, wherein the collage includes a set of content items stored on the client device;
in accordance with a determination that the collage satisfies the first criterion, presenting the collage to the user;
tracking user-interaction data based on user interaction with the collage;
providing the user-interaction data to the server system;
receiving an updated classification model, including an updated first criterion, from the server system in accordance with the user-interaction data;
generating a new collage for the user of the social networking service, wherein the new collage includes a new set of content items stored on the client device; and
in accordance with a determination that the new collage satisfies the updated first criterion, presenting the new collage to the user for a threshold period of time.

2. The method of claim 1, wherein tracking user-interaction data based on the user interaction comprises detecting if the user is viewing the presented collage in the application or if the user is posting the presented collage to the social networking service.

3. The method of claim 1, further comprising:
tracking interaction of other users, at other client devices, with the presented collage, after the user posts the presented collage to the social networking service, to obtain other user-interaction data; and
providing the other user-interaction data to the server system;
wherein the updated classification model from the server system is further based on the other user-interaction data.

4. The method of claim 1, wherein tracking user-interaction data is further based on tracking at least one of:
location, age, group, and/or sex of the user;
platform of the client device; and
time period of the interaction.

5. The method of claim 1, further comprising:
receiving user-specific data for the user from the server system;
wherein generating the new collage is based at least in part on the user-specific data.

6. The method of claim 1, further comprising:
detecting a post input for the new collage from the user within the threshold period of time; and
posting the new collage to the social networking service in response to detecting the post input.

7. The method of claim 1, further comprising:
while generating the new collage, arranging the new set of content items such that each content item of the new set of content items is visible.

8. The method of claim 1, further comprising:
ceasing to present the new collage in accordance with a determination that the user has not posted the new collage within the threshold period of time after presenting the new collage.

9. The method of claim 1, further comprising:
detecting new content items stored on the client device independently of the application; and
in response to detecting the new content items, selecting the new set of content items from the detected new content items based, at least in part, on metadata for the new set of content items, wherein the metadata is stored at the client device.

10. The method of claim 9, wherein the metadata for the new set of content items are selected from the group consisting of time, location, data indicating user modifications, data indicating capture method, and one or more quality measures.

11. The method of claim 9, wherein selecting the new set of content items from the detected new content items comprises selecting respective content items of the detected new content items that are associated with an event.

12. The method of claim 1, wherein the criterion included in the updated classification model is a score threshold and generating the new collage comprises:
   determining a score for the new set of content items based at least in part on metadata for the new set of content items, wherein the metadata is stored at the client device;
   wherein presenting the new collage to the user for the threshold period of time in the application is performed in accordance with a determination that the score satisfies the score threshold of the updated classification model.

13. The method of claim 12, further comprising:
   modifying the score for the new collage in accordance with a determination that the user has not interacted with the new collage within the threshold period of time after presenting the new collage.

14. The method of claim 13, further comprising:
   ceasing to present the new collage to the user in accordance with a determination that the modified score for the new collage no longer satisfies the score threshold.

15. The method of claim 14, further comprising:
   determining a score for the set of content items based at least in part on metadata for the set of content items, wherein the metadata is stored at the client device; and
   providing the score along with the user-interaction data to the server system.

16. A client device, comprising:
   one or more processors; and
   memory storing an application of a social networking service for execution by the one or more processors, the application including instructions for:
      receiving a classification model from a server system associated with the social networking service, wherein the classification model includes a first criterion for evaluating sets of content items stored on the client device;
      generating a collage for a user of the social networking service, wherein the collage includes a set of content items stored on the client device;
      in accordance with a determination that the collage satisfies the first criterion, presenting the collage to the user;
      tracking user-interaction data based on user interaction with the collage;
      providing the user-interaction data to the server system;
      receiving an updated classification model, including an updated first criterion, from the server system in accordance with the user-interaction data;
      generating a new collage for the user of the social networking service, wherein the new collage includes a new set of content items stored on the client device; and
      in accordance with a determination that the new collage satisfies the updated first criterion, presenting the new collage to the user for a threshold period of time.

17. The client device of claim 16, wherein tracking user-interaction data based on the user interaction comprises detecting if the user is viewing the presented collage in the application or if the user is posting the presented collage to the social networking service.

18. The client device of claim 16, wherein the application further includes instructions for:
   tracking interaction of other users, at other client devices, with the presented collage, after the user posts the presented collage to the social networking service, to obtain other user-interaction data; and
   providing the other user-interaction data to the server system;
   wherein the updated classification model from the server system is further based on the other user-interaction data.

19. The client device of claim 16, wherein tracking user-interaction data is further based on tracking at least one of:
   location, age, group, and/or sex of the user;
   platform of the client device; and
   time period of the interaction.

20. A non-transitory computer-readable storage medium, storing an application of a social networking service for execution by one or more processors of a client device, the application including instructions for:
   receiving a classification model from a server system associated with the social networking service, wherein the classification model includes a first criterion for evaluating sets of content items stored on the client device;
   generating a collage for a user of the social networking service, wherein the collage includes a set of content items stored on the client device;
   in accordance with a determination that the collage satisfies the first criterion, presenting the collage to the user;
   tracking user-interaction data based on user interaction with the collage;
   providing the user-interaction data to the server system;
   receiving an updated classification model, including an updated first criterion, from the server system in accordance with the user-interaction data;
   generating a new collage for the user of the social networking service, wherein the new collage includes a new set of content items stored on the client device; and
   in accordance with a determination that the new collage satisfies the updated first criterion, presenting the new collage to the user for a threshold period of time.

* * * * *